UNITED STATES PATENT OFFICE 2,042,392

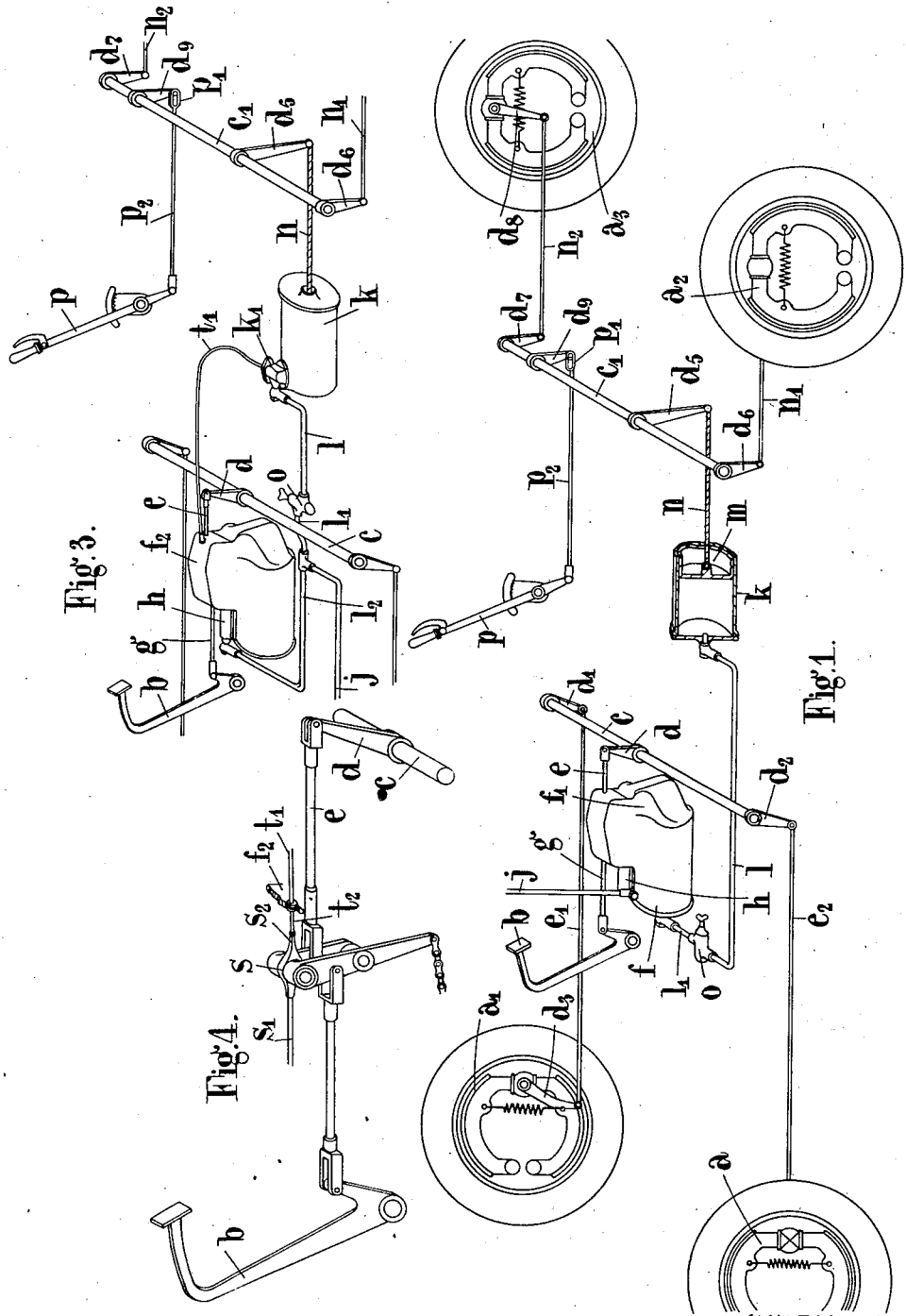

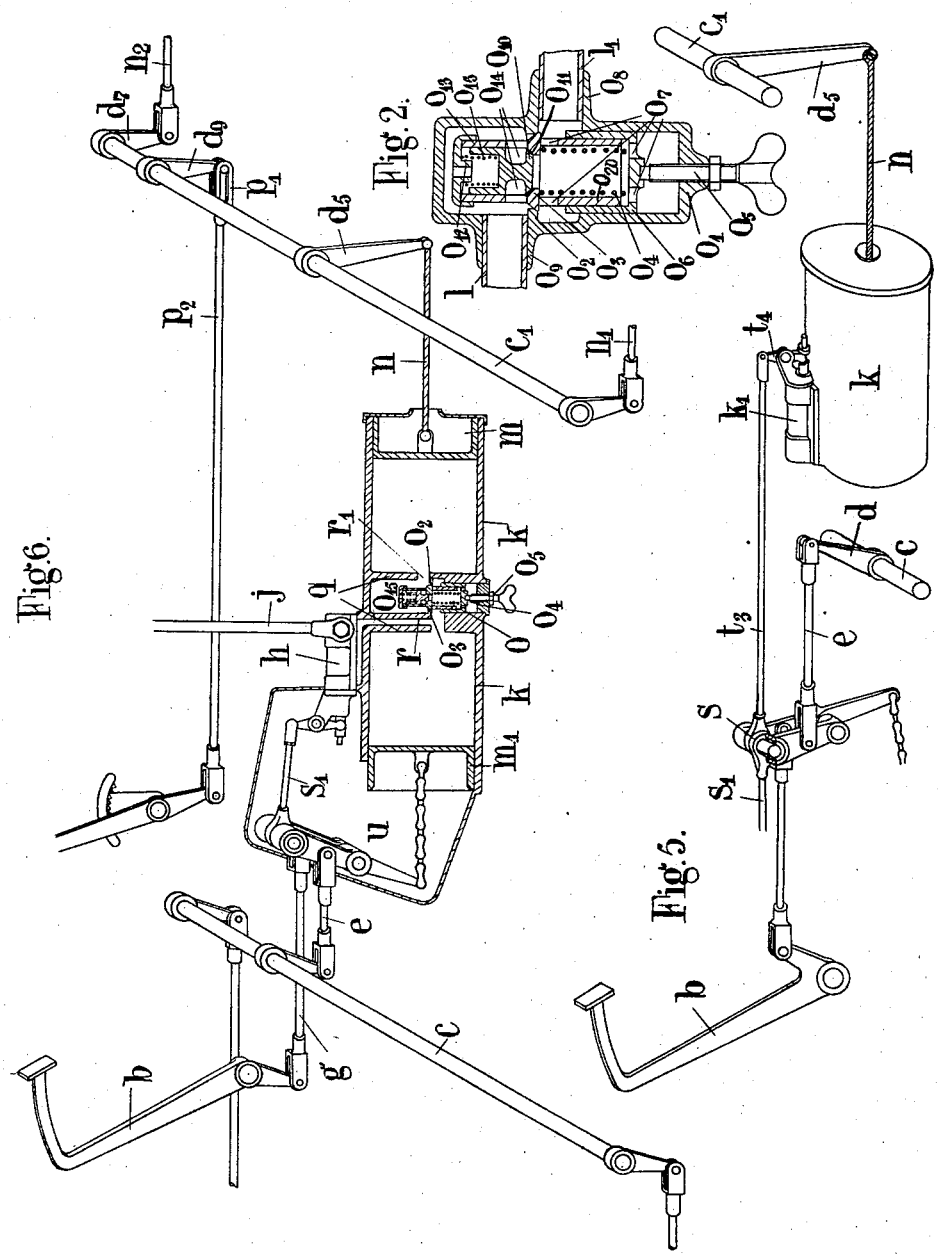

BRAKING OF VEHICLES

Albert Dewandre, Brussels, Belgium, assignor to Societe Anonyme Du Servo Frein Dewandre, Liege, Belgium Application January 13, 1930, Serial No. 420,516
In Great Britain June 17, 1929

5 Claims. (Cl. 188—152)

This invention relates to and has for its object improvements in the braking of vehicles, more especially relating to such arrangements of braking wherein power applied brakes are used.

On the application of braking to a moving vehicle, it is well known that the retardation produced results in a re-distribution of the weight of the vehicle amongst the wheels thereof, a part of the weight initially carried by the rear wheels when running at constant speed being thrown forward and added to the normal weight carried by the front wheels. As the grip of a wheel on the road surface increases with the weight applied to it, the capacity of the front wheels of a vehicle for braking or retarding the vehicle increases, and there is a corresponding decrease in the retarding power of the rear wheels. It is thus advantageous to provide for re-apportioning the total braking forces between the front and rear wheels of a vehicle in such a way that when the capacity of the front wheels for retarding the vehicle increases, so can the ratio of braking forces applied respectively to the front and rear brakes also be increased. It is also desirable to provide for altering the proportion or apportioning of the braking according to the weight which is being carried by the vehicle, that is according to whether the vehicle is empty or loaded, and it is also desirable when say four-wheel braking is provided and the braking forces are applied solely by manual effort, that is, unassisted by power as when same is unavailable, to apply such braking to those wheels which will have the greatest grip, usually the front wheels, as otherwise a considerable amount of the manual effort is wasted in overcoming friction in the transmission system leading to the less effective rear brakes.

The invention consists in a vehicle braking system comprising power operable brakes wherein the ratio between the braking force applied to some of the brakes and that applied to other brakes is variable with increase of the total braking force by the superposing upon the power braking force to some of the brakes of manual effort initially effective in bringing into operation and controlling the extent of the power braking.

The invention further consists in a braking system wherein the braking force to some of the brakes is due to the combination of power braking force and the pressure necessary to overcome the reaction upon manually actuated means controlling same.

The invention further consists in a braking system wherein the said ratio is increasable with increase of the total braking.

The invention further consists in a braking system wherein the ratio between the power braking efforts applicable to different sets of brakes is variable as by adjustment of vacuum-reducing means as, for instance, to accommodate conditions of loading of the vehicle.

The invention further consists in a braking system as set forth, wherein braking normally power-applied only is supplemental or substitutable at will by manual effort.

The invention further consists in a vehicle braking system, wherein front wheel brakes are operable by direct effort of a manually-applied lever in combination with effort due to a vacuum or other "servo" and controlled in degree by said lever, and a rear set of brakes is simultaneously operable solely by effort of a power system fluid-coupled only to the "servo" and a second manually-operable lever being provided for supplementing at will the braking on said rear brakes.

The invention further consists in a vehicle braking system comprising pedal-assisted "servo" mechanism in operative connection with a front set of brakes only and a vacuum cylinder in fluid connection with said "servo" mechanism and having a piston or the like in operative connection with a rear set of brakes, a manually-operable lever being preferably provided in operative connection through a lost-motion or like device with said rear set of brakes.

The invention further consists in a vehicle braking system as set forth, wherein a single vacuum or like cylinder is provided with a plurality of independently-movable pistons or equivalent members, in separate operative connection with different sets of brakes.

The invention further consists in utilizing the pressure necessary to be applied to the brake controlling pedal to overcome the reaction on such pedal as a means of not only increasing the total braking effect of the system but also increasing the ratio between the braking forces on the respective sets of brakes, which result is incident to the fact that the manual pressure on the pedal increases the braking force on one set of brakes to the exclusion of the other set of brakes.

The invention further consists in the improved vehicle braking systems and arrangements substantially as hereinafter described.

The invention further consists in the improvements in or relating to the braking of vehicles substantially as hereinafter described or substantially as described with reference to the various accompanying drawings.

Referring to the accompanying drawings:—

Figure 1 is a diagrammatic perspective view of a four-wheeled vehicle braking system in accordance with the present invention;

Figure 2 is an enlarged detail view in section of a vacuum-reducing and relieving valve device incorporated in braking systems according to the present invention;

Figure 3 is a view on the lines of Figure 1, showing a modified braking system;

Figure 4 is an enlarged fragmental detail view of part of the structure shown in Figure 3;

Figure 5 is an enlarged fragmental detail of a modification of the system shown in Figures 3 and 4;

Figure 6 is a view on the lines of Figures 1 and 2, showing a further modified braking system.

In carrying the invention into effect in the convenient form illustrated in Figures 1 and 2, a motor vehicle having brakes $a$, $a_1$, $a_2$, $a_3$ on each of the four wheels is provided with power braking of the well-known Dewandre vacuum "servo" type such as exemplified in Patents Nos. 1,539,166 and 1,603,750 and Reissue Patents Nos. 16,723 and 16,724, wherein depression of a foot pedal $b$ by the driver results in brakes being actuated by combination of effort exerted through a piston or equivalent and suitable force-transmitting means such as a transverse rod $c$ with levers $d$, $d_1$, $d_2$, $d_3$ and links or rods $e$, $e_1$, $e_2$ by vacuum from the induction of the engine, and manual effort in counteracting reaction by the pedal on the driver's foot, movement of which pedal is initially or primarily effective in bringing the vacuum into operation on the piston by opening a distributing valve and controlling the degree of vacuum.

The "servo" cylinder $f$ is as is well known a vacuum cylinder with a piston therein which latter is coupled by a chain or the like to a system of levers enclosed within the casing at $f_1$ to which system the rod $g$ from the pedal lever $b$ is also coupled so as to open in the first part of its movement a distributor valve. The latter, shown at $h$, is adapted to admit vacuum to the back of the piston through the pipe $j$ leading to the induction pipe of the engine and the operation of the whole is as has been described already in prior patent specifications.

In a system according to the present invention, such manual effort and co-operating power effort is applied only to the front set of brakes and one advantage which accrues is that in the event of failure or absence of the vacuum or equivalent, the manual effort, which can still be applied through the pedal by the driver, may be applied only to said front brakes and therefore be most usefully and efficiently applied.

Again referring to Figure 1, for the operation of the rear wheel brakes $a_2$ and $a_3$, a separate vacuum cylinder $k$ is provided in fluid connection by a pipe $l$ either as shown directly with the vacuum space of the "servo" cylinder $f$ the piston in which is connected to the front brakes, or with the distributor of said "servo", or as shown in Figures 3 and 5 a second distributor $k_1$ specially provided on the vacuum cylinder $k$, a piston $m$ or the equivalent in said vacuum cylinder being in force-transmitting connection, with the rear brakes for instance, through a chain or wire $n$, a second transverse rod $c_1$, levers $d_5$, $d_6$, $d_7$, $d_8$ and links or rods $n_1$, $n_2$. Said second rod or the like $c_1$ is in no way otherwise, i. e. in no way in direct mechanical connection with the front braking system.

To enable the relation between the degrees of vacuum in the "servo" cylinder and the vacuum cylinder respectively to be varied to suit requirements as for instance to ensure the greatest proportion of the total braking force being transmitted to the front brakes, a regulatable reducing valve or the like $o$ is provided between the source of vacuum and the vacuum cylinder preferably in the pipe leading to the latter from the "servo" cylinder or distributor, and such regulation may be effected and the difference between the degrees of vacuum determined by adjusting the tension of a spring or the like forming part of the reducing valve mechanism.

Co-operating with the reducing valve, a second valve indicated at $o_{10}$ and hereinafter referred to is provided, say in opposition to the reducing valve, and operative in such a way as to open the vacuum cylinder in the rear braking line to atmosphere through the "servo" cylinder or distributor when debraking takes place by release of pressure on the foot pedal.

Figure 2 shows a suitable valve in which a hollow casing $o_1$ is provided internally with a valve seating $o_2$ against which a mushroom valve $o_3$ is held by a compression spring $o_4$ the tension on which is regulatable by an adjusting screw $o_5$ acting on the back of a sleeve $o_6$ which is slidable within the casing and within which a sleeved extension $o_{20}$ of the valve $o_3$ is slidable. The spring $o_4$ abuts on the back of the valve at one end and on the bottom of the sleeve $o_6$ at the other end. Ports $o_7$ are provided in the valve extension and also in the sleeve $o_6$ and a side branch $o_8$ connected to the engine induction via the pipe $l_1$ and a distributor or the vacuum cylinder of the "servo" admits vacuum into the lower part of the casing $c_1$. Such vacuum when of sufficient degree to overcome the action of the spring $o_4$ causes the valve $o_3$ to be drawn off its seat $o_2$ with the result that vacuum can be applied through the side branch $o_9$ and pipe $l$ to the cylinder $k$ serving the back brakes. For effecting release of vacuum by admission of air to the back brake cylinder a second valve $o_{10}$ is provided housed within the structure of the valve $o_3$ and engaging a seating $o_{11}$ provided in an opening through the valve $o_3$. The inner valve $o_{10}$ is held against the seating $o_{11}$ by a light compression spring $o_{15}$ contained between an extension on the back of the valve $o_{10}$ and an end cap or the like $o_{12}$ provided on an upward tubular extension $o_{13}$ of the other valve $o_3$. Ports $o_{14}$ effect communication between the back of the valve $o_{10}$ and the side branch $o_9$ so that when the vacuum below the valve $o_3$ is released the increase of pressure below the valve $o_{10}$ will cause same to open against the light spring $o_{15}$ and establish substantial equilibrium between the pressure in the pipe $l$ and cylinder $k$ and that in the "servo" cylinder.

To conform with regulations as to the braking of vehicles, a hand lever $p$ is also provided, this according to the present invention being in operative connection with the rear brakes only and conveniently through the same transmission system, for instance, a lever $d_9$ and the said second transverse rod $c_1$, as is acted upon by the piston $m$ of the vacuum cylinder $k$ referred to. A slotted connection or similar lost-motion or like device is provided at $p_1$ between the end of the connecting rod $p_2$ and the lever $d_9$ so that the hand lever is not moved by action of the vacuum piston, although said hand lever $p$ can at any time be used to supplement manually the power braking forces to the rear brakes, or in the absence of vacuum, or in other emergency may be the sole means of applying the rear brakes.

The action of a braking system as set forth above is as follows:—

When the driver applies his foot to the pedal and depresses same, vacuum will be created in the "servo" cylinder and braking forces will be applied to the front wheels. In the vacuum cylinder acting on the rear brakes a vacuum will also be established and may be smaller than the one existing in the "servo" cylinder, the difference depending upon the tension of the spring or the like acting on the reducing valve hereinbefore described.

The amount of braking force applied to the rear brakes will thus be a controllable and variable function of the vacuum existing in the "servo" cylinder without the addition of any force directly due to manual pedal effort and any increased effort on the pedal in excess of that necessary to overcome the reaction thereon will be added only to the braking forces already applied on the front brakes.

The system thus provides a compensating braking for front and rear wheels by fluid interconnection and has the advantage that the rato between the braking to the front and the braking to the rear increases with the total amount of braking applied, and the said ratio can be altered by the use of the reducing valve. Also the system provides for four-wheel braking in which two sets of brakes, which are not in mechanical interconnection, can at any time and under any circumstances be actuated manually by two separate means, namely, the foot pedal as to the front brakes in a system as above described and the hand lever referred to as to the rear brakes.

In the modification shown in Figure 6 a single vacuum cylinder or unit is provided and used to serve the front and rear brakes respectively. Thus an elongated cylinder $k$ is provided with two pistons $m$, $m_1$ or equivalents therein capable of movement in opposite directions say towards each other by vacuum applied between them. One of said pistons $m_1$ is coupled to the front brakes through the "servo" lever system indicated by $u$ and the other is coupled through the wire $n$, lever $d_5$, rod $c_1$, levers like $d_7$ and rods $n_1$, $n_2$ with the back brakes. In such an arrangement if different power efforts are required to be transmitted or transmittable to the front and rear brakes respectively, the effect may be obtained as shown by the provision in the cylinder of suitable partition means $q$ housing a reducing valve $o$ as described above or an equivalent device between the opposed pistons whereby the degrees of vacuum effective on each piston may be varied. The vacuum pipe $j$ is brought to the pedal-actuated distributor $h$ from which vacuum is admitted through the port $r$ directly to the space behind the piston $m_1$ and into the under side of the valve $o_3$. The space behind the piston $m$ is in communication through the port $r_1$ with the other side of the valve seating $o_2$.

A system such as the foregoing is also adaptable for use with pressure "servo", for instance, air pressure "servo" in place of vacuum "servo", the desideratum being that the ratio between the force applied to some of the brakes and that applied to other brakes can be varied directly as the total braking is increased, and this by the superposing of pedal reaction on the power braking force applied to the first set of brakes.

Referring again to Figures 3 and 5, in both modifications, the vacuum cylinder $k$ is provided with a separate distributor valve at $k_1$, this being in operative connection with the distributor of the "servo" mechanism. In the arrangement shown in Figures 3 and 4 a Bowden or like flexible connection is provided the tube element $t_1$ of which is fixed at its ends respectively to the casing of the distributor $k_1$ and the casing of the "servo" at $f_2$ and the wire element $t_2$ is connected at its ends with the valve in the distributor $k_1$ and with the valve in the "servo" distributor so that these valves are moved simultaneously. This device is shown more clearly in Figure 4 wherein an eye $s$ in the "servo" lever mechanism to which is attached the spindle $s_1$ leading to the "servo" distributor valve also provides an attachment at $s_2$ for the wire of the Bowden operating the other distributor valve.

In Figure 5 is shown an arrangement wherein the alignment of the cylinder $k$ with respect to the "servo" mechanism is such as to permit the Bowden of Figures 3 and 4 being substituted by a rigid connection in the form of a rod $t_3$ connecting the eye $s$ of the "servo" lever mechanism with one end of a rocker arm $t_4$ the other end of which acts upon the distributor valve $k_1$ which in this case is most conveniently disposed longitudinally of the vacuum cylinder $k$.

Where two separate distributors are provided for front and rear braking respectively as in Figure 3 the pipe $j$ from the induction of the engine may be arranged as shown to branch respectively through the pipe $l_2$ to the "servo" distributor $h$ and through the pipe $l_1$, reducing valve $o$ and pipe $l$ to the other distributor $k_1$.

Other modifications and additions it is to be understood may be made without departing in any way from the spirit of the invention.

I claim:

1. In a braking system for automotive vehicles, braking mechanisms operative on some of the wheels, braking mechanisms operative on others of the wheels, a source of power common to both braking mechanisms, a manually operable element, a control valve operated by said element for governing power admission to the braking mechanisms, and a reducing valve directly responsive to the source of power as governed by the control valve, said reducing valve being independent of the control valve and compelling constant differential braking efforts on the respective braking mechanisms.

2. In a braking system for automotive vehicles, independent brake mechanisms, a power actuator for each of said brake mechanisms, a source of power common to said brake actuators, a manually operable element, a control valve operated by said element for controlling communication between the source of power and the brake actuators, and a reducing valve directly responsive to the source of power as released by the control valve for varying the effect of the power on one of the power actuators to thereby create a constant differential of effort of the respective brake mechanisms.

3. In a braking mechanism for automotive vehicles, independent braking mechanisms, a power actuator for each of said braking mechanisms, a source of power common to said power actuators, a manually operable element, a control valve actuated by said element for controlling communication between the source of power and said power actuators, and a reducing valve directly responsive to the source of power as released by the control valve for varying the effect of the power on one power actuator as compared with the power effect on the other power actuator, whereby to create a constant differential of braking effort of said respective braking mechanisms.

4. In a braking mechanism for automotive vehicles, independent braking mechanisms, a power actuator for each of said braking mechanisms, a source of power common to said power actuators, a manually operable element, a control valve actuated by said element for controlling communication between the source of power and said power actuators, and an adjustable reducing valve directly responsive to the source of power as released by the control valve for varying the effect of such power on one power actuator as compared with the power effect on the other power actuator, whereby to create a constant differential of braking effort of said respective braking mechanisms.

5. In a braking system for automotive vehicles, independent braking mechanisms, a power actuator for each of said mechanisms, a source of power common to the power actuators, a manually operable element, a control valve actuated by the element for controlling power admission directly to one of the power actuators, a reducing valve controlling the power admitted to one of the power actuators through the control valve for admission to the other of said power actuators to create a constant differential braking effort of one of the power actuators, and means to utilize the braking effort of that power actuator directly responsive to the control valve to create a reaction on the manually operable element.

ALBERT DEWANDRE.